US007220697B2

(12) United States Patent
Pak et al.

(10) Patent No.: US 7,220,697 B2
(45) Date of Patent: May 22, 2007

(54) MESOPOROUS CARBON MOLECULAR SIEVE AND SUPPORTED CATALYST EMPLOYING THE SAME

(75) Inventors: Chan-ho Pak, Seoul (KR); Hyuk Chang, Seongnam-si (KR); Ji-man Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/992,211

(22) Filed: Nov. 19, 2004

(65) Prior Publication Data

US 2005/0129604 A1 Jun. 16, 2005

(30) Foreign Application Priority Data

Nov. 21, 2003 (KR) ............... 10-2003-0083041

(51) Int. Cl.
*B01J 21/18* (2006.01)
*B01J 23/40* (2006.01)
*C01B 31/08* (2006.01)
*C01B 31/02* (2006.01)
*D01F 9/12* (2006.01)

(52) U.S. Cl. .......... 502/185; 502/180; 502/416; 502/418; 423/445 R; 423/461

(58) Field of Classification Search ......... 502/180, 502/185, 416, 418, 437; 423/445 R, 461
See application file for complete search history.

(56) References Cited

U.S. PATENT DOCUMENTS 4,348,213 A * 9/1982 Armond .............. 95/103

5,071,450 A * 12/1991 Cabrera et al. .......... 95/138
5,319,114 A * 6/1994 Gaffney et al. .......... 549/529
5,451,444 A * 9/1995 DeLiso et al. .......... 428/116

(Continued)

FOREIGN PATENT DOCUMENTS

JP 2005-154268 * 6/2005
KR 10-2002-0084372 11/2002

OTHER PUBLICATIONS

Antonio B. Fuertes, "Template synthesis of mesoporous carbons with a controlled particle size." Journal of Materials Chemistry, vol. 13, Issue 12, Dec. 2003, pp. 3085-3088. First published as an Advance Article on the web Sep. 22, 2003.*

(Continued)

*Primary Examiner*—J. A. Lorengo
*Assistant Examiner*—Patricia L. Hailey
(74) *Attorney, Agent, or Firm*—H.C. Park & Associates, PLC

(57) ABSTRACT

The present invention is related to a mesoporous carbon molecular sieve, which can be used as a catalyst carrier capable of improving the activity of a supported catalyst and a method of preparing the same. Additionally, the invention is related to a supported catalyst employing the mesoporous carbon molecular sieve as a carrier, and a fuel cell employing the supported catalyst. The mesoporous carbon molecular sieve has an average primary particle size of less than about 500 nm, an average mesopore size in the range of about 3 nm to about 6 nm, and a surface area in the range of about 500 $m^2/g$ to about 2000 $m^2/g$.

2 Claims, 3 Drawing Sheets

U.S. PATENT DOCUMENTS

| | | | |
|---|---|---|---|
| 6,503,295 B1 * | 1/2003 | Koros et al. | 95/51 |
| 6,585,948 B1 * | 7/2003 | Ryoo et al. | 423/445 R |
| 6,812,187 B1 * | 11/2004 | Pak et al. | 502/180 |
| 2002/0187896 A1 * | 12/2002 | Ryoo et al. | 502/418 |
| 2005/0036935 A1 * | 2/2005 | Pak et al. | 423/445 R |

OTHER PUBLICATIONS

J. Eric Hampsey, et al., "Templating synthesis of ordered mesoporous carbon particles" Carbon, vol. 43, Issue 14, Nov. 2005, pp. 2977-2982. Available online Jul. 18, 2005.*

* cited by examiner

MESOPOROUS CARBON MOLECULAR SIEVE AND SUPPORTED CATALYST EMPLOYING THE SAME

CROSS-REFERENCE TO RELATED APPLICATIONS

This application claims priority to Korean Patent Application No. 2003-83041, filed on Nov. 21, 2003, in the Korean Intellectual Property Office, the disclosure of which is incorporated herein in its entirety by reference.

FIELD OF THE INVENTION

The present invention is related to a catalyst support, and in particular, to a carbon-based catalyst support. In particular, the present invention is related to a supported catalyst employing the carbon-based catalyst support. Also, the present invention is related to a fuel cell, and more particularly, to a fuel cell comprising the supported catalyst employing the carbon-based catalyst support.

BACKGROUND

Fuel cells are inherently ultra-clean, highly reliable, and have high power density and high energy-conversion efficiency. Also, since fuel cells can operate at an ambient temperature and can be fabricated in miniaturized form and hermetically sealed, they can be extensively applied to power generating systems for home and regional use, medical equipment, military equipment, space equipment, and used as power sources for portable electrical/electronic devices such as mobile telecommunications equipment.

The fuel cell produces electricity through the electrochemical reaction of fuel, such as hydrogen, natural gas, and methanol, and an oxidizing agent. In general, the fuel cell consists of two electrodes—an anode and a cathode, which are sandwiched around an electrode membrane. The fuel is supplied to the anode where it is electrochemically oxidized, an oxidizing agent, such as oxygen or air, is fed to the cathode where it is electrochemically reduced, and the electrolyte membrane acts as a path for transporting ions produced at the anode to the cathode. Electrons generated at the anode by oxidation of the fuel go through an external circuit, creating a flow of electricity. The protons migrate through the electrolyte to the cathode, where they reunite with the oxidization agent and the electrons to produce water and heat.

A catalyst contained in the anode and the cathode to promote the electrochemical reactions is very important in the fuel cell having such structure. For example, in a polymer electrolyte membrane fuel cell (PEMFC) both of the anode and the cathode generally contain a carbon-supported platinum catalyst having platinum nanoparticles dispersed in a microporous carbon support. Also, in a direct methanol fuel cell the anode catalyst may be, for example, a PtRu alloy powder or a carbon-supported PtRu catalyst having PtRu nanoparticles dispersed in the microporous carbon support, and the cathode catalyst may be, for example, a Pt particle powder or the carbon-supported platinum catalyst having platinum nanoparticles dispersed in the microporous carbon support.

A catalyst support for a fuel cell must exhibit porosity to support and disperse catalytic metal particles and electro-conductivity to act as the path for the migration of electrons. In general, amorphous microporous carbon powder known as activated carbon or carbon black may be used as a catalyst support for the fuel cell.

An amorphous microporous carbon powder is generally prepared by chemically and/or physically activating a raw material, such as wood, peat, charcoal, coal, brown coal, coconut peel, and petroleum coke, for example. Generally, the activated carbon has pores exhibiting a diameter of less than about 1 nm and has a surface area of about 60 $m^2$/g to about 1000 $m^2$/g. In particular, Vulcan Black and Kejten Black, which are commercial products most broadly used as a catalyst support, have a surface area of about 230 $m^2$/g and about 800 $m^2$/g, respectively, and have an average primary particle size of less than about 100 nm. Amorphous microporous carbon particles, however, have poor micropore interconnection. Specifically, in a conventional DMFC, a supported catalyst using amorphous microporous carbon particles as a support has lower reactivity than a catalyst consisting of only metal particles. However, DMFCs employing metal particle catalysts are not cost effective due to the high costs associated with the metal particular catalysts. Thus, there is a need to develop a carbon-based catalyst support that is capable of improving the reactivity of the catalyst for fuel cells, such as PEMFCs, PAFCs and DMFC.

For example, the mesoporous carbon molecular sieve, disclosed in Korean Patent Laid-Open Publication No. 2001-0001127 is an example of such a carbon-based catalyst support. This patent discloses a method of preparing an ordered mesoporous carbon molecular sieve using a mesoporous silica molecular sieve, which is prepared using a surfactant as a template material. In this method based on nano-replication, the ordered mesoporous silica molecular sieve, such as "MCM-48" and "SBA-1", which has micropores connected three-dimensionally by mesopores is used as a template to prepare an ordered mesoporous carbon molecular sieve, such as "CMK-1" and "CMK-2", which has micropores and mesopores with a uniform diameter and regularly arranged.

The mesoporous carbon molecular sieve prepared as described above may be used as a possible carbon-based catalyst support. However, since the particle size of the mesoporous carbon molecular sieve is larger than those of Vulcan Black and Kejten Black, there is a need to improve the catalytic activity in the mesoporous carbon molecular sieve.

SUMMARY OF THE INVENTION

The present invention is directed to an improved mesoporous carbon molecular sieve and a method of preparing the same. The mesoporous carbon molecular sieve of the invention, may be used as a catalyst support to improve the activity of a supported catalyst. Additionally, the present invention is also directed to a supported catalyst employing the mesoporous carbon molecular sieve as a support. The present invention also provides a fuel cell employing the supported catalyst.

According to an aspect of the present invention, a mesoporous carbon molecular sieve having an average primary particle size of less than about 500 nm, an average mesopore size in the range of about 3 nm to about 6 nm, and a surface area in the range of about 500 $m^2$/g to about 2,000 $m^2$/g is provided.

According to another aspect of the present invention, a method of preparing the mesoporous carbon molecular sieve is provided. The molecular sieve may be prepared in the following manner. A mesoporous silica molecular sieve having an average primary particle size in the range of about 100 nm to about 700 nm is prepared, then, the mesoporous carbon molecular sieve using the mesoporous silica molecular sieve as a template is prepared.

An additional aspect of the present invention is directed to a method of preparing a mesoporous silica molecular sieve having an average primary particle size in the range of about 250 nm to about 700 nm. The silica molecular sieve may be prepared in the following manger. A reaction of Sodium silicate with Na:Si having an atomic ratio of about 1.5 to about 2.5, a poly(ethyleneglycol)-block-poly(propyleneglycol)-block-poly(ethyleneglycol), and acetic acid in a water-based reaction medium may be employed to produce precipitates, and then, the precipitates may be dried and calcined.

According to another aspect of the present invention, a method of preparing the mesoporous carbon molecular sieve is provided. The method may be carried out in the following manner. A carbon precursor may be filled into pores of a template of the mesoporous silica molecular sieve having an average primary particle size in the range of about 250 nm to about 700 nm, then the carbon precursor may be thermally degraded by heating the template having the carbon precursor impregnated under a non-oxidizing atmosphere to form a carbon structure in the pores of the template. Then, the template may be removed using a silica-soluble solution in order to isolate the carbon structure.

According to another aspect of the present invention, a supported catalyst including the mesoporous carbon molecular sieve having an average primary particle size of less than about 500 nm, an average mesopore size in the range of about 3 nm to about 6 nm, and a surface area in the range of about 500 $m^2/g$ to about 2000 $m^2/g$; and catalytic metal particles dispersed in and supported on the mesoporous carbon molecular sieve is provided.

According to another aspect of the present invention, a fuel cell comprising a cathode, an anode, and an electrolyte membrane interposed between the cathode and the anode, where at least one of the cathode and the anode may contain the supported catalyst according to the present invention is provided.

DETAILED DESCRIPTION OF THE INVENTION

Figure 1:
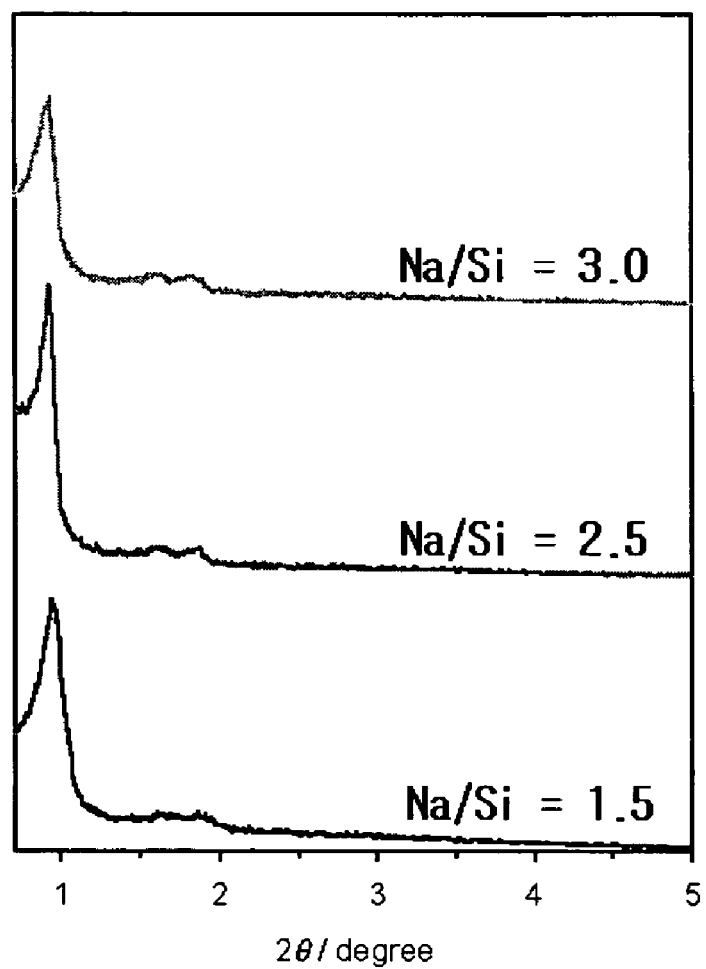
FIG. 1 illustrates an XRD analysis result for a mesoporous silica molecular sieve obtained in an Example of the present invention.

The present invention is directed to a mesoporous carbon molecular sieve, which has the shape of a porous particle substantially consisting of carbon. Unlike a conventional amorphous microporous carbon powder having mainly micropores, the mesoporous carbon molecular sieve of the present invention may have both mesopores and micropores in an appropriate ratio. In the present invention, the term "micropores" means pores having a diameter less than about 2 nm, the term "mesopores" means pores having a diameter in the range of about 2 nm to about 10 nm, and a molecular sieve refers to porous particles having mesopores and micropores with substantially uniform size.

In an embodiment of the present invention, pores of the mesoporous carbon molecular sieve may or may not be regularly arranged. Regardless of this, in the mesoporous carbon molecular sieve of the present invention, micropores interconnect via mesopores or mesopores interconnect via micropores. Accordingly, reactants can be easily supplied, via mesopores, to micropores, and products created in micropores can be easily discharged outside of supported catalyst particles through mesopores. Such a mesoporous carbon molecular sieve may be characterized by an average size (or diameter) of mesopores and a surface area as well as an average primary particle size.

When the mesoporous carbon molecular sieve is used as a support of a supported catalyst, as the primary particle size of the mesoporous carbon molecular sieve decreases, electrochemical activity of the supported catalyst increases compared with that of a conventional Black supported platinum catalyst. The diffusion of reactants and removal of products in the supported catalyst may be smoothly performed by decreasing the primary particle size of the mesoporous carbon molecular sieve having micropores and mesopores regularly arranged, thus enabling all of the catalytic metal particles present even in the micropores in the support to participate in the electrochemical reaction.

There is an appropriate range for the average primary particle size of the mesoporous carbon molecular sieve used as the support, and the appropriate range is less than about 500 nm, and in particular, in the range of about 250 nm to about 350 nm. Specifically, the primary particle size may be about 300 nm.

The mesoporous carbon molecular sieve of the present invention may be characterized as follows. The mesoporous carbon molecular sieve of the present invention may have an average mesopore size in the range of about 3 nm to about 6 nm and a surface area in the range of about 500 $m^2/g$ to about 2000 $m^2/g$. The average mesopore size of the mesoporous carbon molecular sieve may be preferably in the range of about 3.5 nm to about 5 nm. The surface area of the mesoporous carbon molecular sieve may be in the range of about 800 $m^2/g$ to about 1500 $m^2/g$. A method of preparing the mesoporous carbon molecular sieve of the present invention may be performed as follows. A mesoporous silica molecular sieve having an average primary particle size in the range of about 250 nm to about 700 nm may be prepared, and then, a mesoporous carbon molecular sieve may be prepared by using the mesoporous silica molecular sieve as a template. In a further embodiment, the mesoporous silica may have an average primary particle size in the range of about 250 nm to about 500 nm, and more specifically, in the range of about 275 nm to about 325 nm. The method of the present invention is based on "nano-replication". In other words, pores of the mesoporous silica molecular sieve used as the template may be filled with carbon, and then the silica molecular sieve may be removed using a silica-soluble solution to isolate a carbon molecular sieve. Here, the average primary particle size of the final carbon molecular sieve is proportional to the average primary particle size of the mesoporous silica molecular sieve. Thus, the method may include adjusting process of the particle size of the mesoporous silica molecular sieve.

Additionally, the present invention may provide a method of adjusting the average primary particle size of the mesoporous silica molecular sieve. The method may include reacting NaOH with $SiO_2$ in a water-based reaction medium to form sodium silicate; reacting the sodium silicate, a poly(ethyleneglycol)-block-poly(propyleneglycol)-block-poly(ethyleneglycol), and a pH controller in a water-based reaction medium to obtain precipitates; and then, drying and calcining the precipitates to obtain the mesoporous silica molecular sieve. The Na:Si atomic ratio of the formed sodium silicate may be adjusted by relatively adjusting the amounts of NaOH and $SiO_2$ when forming the sodium silicate, and the average particle size of the formed mesoporous silica may be decreased by increasing the atomic ratio of Na:Si.

When forming sodium silicate, the water-based reaction medium acts as a solvent for NaOH and as a dispersion medium for $SiO_2$ particles. In order to form sodium silicate having the desired Na:Si atomic ratio, NaOH and $SiO_2$ may be added to the water-based reaction medium in a relative amount corresponding to the desired Na:Si atomic ratio. However, the absolute contents of NaOH and $SiO_2$ are not particularly limited. When the reactants are too diluted or concentrated, the reaction may not occur smoothly. Therefore, the adding amount of NaOH may be typically in the range of about 10 parts to about 30 parts by weight based on 100 parts by weight of the water-based reaction medium. The added amount of $SiO_2$ may be in the range of about 10 parts to about 15 parts by weight based on 100 parts by weight of the water-based reaction medium. The reaction temperature and the reaction time in this step are not particularly limited. When the reaction temperature is too low, $SiO_2$ may not dissolve well. When the reaction temperature is too high, the composition of the whole solution may fluctuate. Therefore, the reaction temperature may be in the range of about 60° C. to about 80° C. The reaction time may be easily selected to obtain sodium silicate at an appropriate yield according to other reaction conditions and is typically in the range of about 0.5 hours to about 2 hours. The resultant product may be a type of transparent water-based solution containing sodium silicate.

Next, the sodium silicate, the poly(ethyleneglycol)-block-poly(propyleneglycol)-block-poly(ethyleneglycol), and the pH controller may be reacted in a water-based reaction medium to obtain precipitates. In this step, the sodium silicate may be added to the water-based reaction medium in a dried state or in the form of the transparent water-based solution obtained in the previous step. The poly(ethyleneglycol)-block-poly(propyleneglycol)-block-poly(ethyleneglycol) (P123 polymer (BASF Co.)) may be used as a template material to form micropores. As the pH controller, a general acid may be used. A representative example of the pH controller may be acetic acid.

When the amount of sodium silicate added to the water-based reaction medium is too low, the mesoporous structure may not form. When the amount of sodium silicate is too high, the amount of amorphous $SiO_2$ may increase. Therefore, the amount of sodium silicate added to the water-based reaction medium may be in the range of about 13 parts to about 20 parts by weight based on 100 parts by weight of the water-based reaction medium.

When the amount of poly(ethyleneglycol)-block-poly(propyleneglycol)-block-poly(ethyleneglycol) added to the water-based reaction medium is too little, mesopores may not form. When the amount of poly(ethyleneglycol)-block-poly(propyleneglycol)-block-poly(ethyleneglycol) is too great, a mesoporous substance of non-desirable structures may form or no structure may form. Therefore, the amount of poly(ethyleneglycol)-block-poly(propyleneglycol)-block-poly(ethyleneglycol) added to the water-based reaction medium may be in the range of about 1 part to about 5 parts by weight based on 100 parts by weight of the water-based reaction medium.

Also, if the amount of acetic acid added to the water-based reaction medium is too little, a large amount of NaOH may not be neutralized, and the structure formation cannot be performed. When the amount of the acetic acid added to the water-based reaction medium is too great, the acidity increases, and the particle size of silica substance cannot be controlled. Hence, the amount of acetic acid added to the water-based reaction medium may be in the range of about 2 parts to about 7 parts by weight based on 100 parts by weight of the water-based reaction medium.

The order of adding the reactants to the water-based reaction medium is not particularly limited. Typically, the transparent water-based solution containing sodium silicate may be mixed with an aqueous poly(ethyleneglycol)-block-poly(propyleneglycol)-block-poly(ethyleneglycol) solution, and then the acetic acid may be added to the mixture. In this step, the reaction temperature and the reaction time are not particularly limited. However, when the reaction temperature is too low, the poly(ethyleneglycol)-block-poly(propyleneglycol)-block-poly(ethyleneglycol) may not dissolve well in the water-based reaction medium. When the reaction temperature is too high, the composition of the solution or the structure of the silica substance may fluctuate. Therefore, the reaction temperature is typically in the range of about 30° C. to about 60° C. The reaction time may be easily selected to obtain precipitates at an appropriate yield, according to other reaction conditions, and is typically in the range of about 5 hours to about 48 hours. The resultant precipitates are a type of white powder.

The resultant precipitates are separated and dried and then subjected to calcination to obtain the mesoporous silica molecular sieve having the desired average primary particle size. The separation of precipitates may be performed in a conventional manner, such as filtration/washing, and centrifuging. The drying temperature and drying time of the precipitates are not particularly limited. Typically, drying of the precipitates may be performed at room temperature for a time period in the range of about 12 hours to about 36 hours. Then, the dried precipitates may be calcined. The calcination may be performed under an oxidizing atmosphere such as air. When the calcination temperature is too low, micropores are not created since the template material and other impurities remain. When the calcination temperature is too high, the uniformity of the micropores may decrease. Therefore, the calcination temperature may be in the range of about 450° C. to about 700° C. Also, when the calcination time is too short, the template material and other impurities can possibly remain. When the calcination time is too long, a large amount of time may be spent to calcine. In view of this, the calcination time may be in the range of about 5 hours to about 15 hours.

In order to adjust the average primary particle size of the silica molecular sieve to the range of about 250 nm to about 700 nm, the Na:Si atomic ratio of sodium silicate may be adjusted to about 1.5 to about 2.5. Accordingly, the method of preparing the mesoporous silica molecular sieve having the average primary particle size in the range of about 250 nm to about 700 nm includes reacting sodium silicate with Na:Si atomic ratio of about 1.5 to about 2.5, the poly(ethyleneglycol)-block-poly(propyleneglycol)-block-poly(ethyleneglycol), and acetic acid to obtain precipitates; and drying and calcining the precipitates.

As described above, the mesoporous carbon molecular sieve of the present invention may be prepared using nano-replication. In other words, the method of preparing the mesoporous carbon molecular sieve may include filling a carbon precursor into pores of a template composed of the mesoporous silica molecular sieve having an average primary particle size in the range of about 250 nm to about 700 nm; thermally decomposing the carbon precursor by heating the template having the carbon precursor impregnated under non-oxidizing atmosphere, to form a carbon structure in the pores of the template; and removing the template using a silica-soluble solution to isolate the carbon structure.

The mesoporous silica molecular sieve having an average primary particle size of about 250 nm to about 700 nm as described above may be used as the template for the nano-replication. The carbon precursor filled in the pores of the template may be any material capable of being carbonized by thermal decomposition. Examples of the carbon precursor include a polymer of a carbon-containing compound capable of being polymerized. The polymerization includes various types of polymerization, such as addition polymerization and condensation polymerization, for example. Examples of the carbon-containing compound capable of being polymerized include carbohydrates and monomers, for example. Hereinafter, the carbon-containing compound capable of being polymerized is referred to as a polymerizable carbon-containing compound.

The carbohydrates are classified into monosaccharides, oligosaccharides, and polysaccharides. In the present invention, monosaccharides, oligosaccharides, and a mixture thereof may specifically be used. Representative examples of the monosaccharides include glucose, fructose, mannose, galactose, ribose, and xylose. These materials may be used alone or in a combination of two or more. The oligosaccharides are carbohydrates composed of two or more of monosaccharides joined together by a glycoside link. Saccharides from disaccharides composed of two monosaccharides to decasaccharides composed of ten monosaccharides are collectively called oligosaccharides. The oligosaccharides may include simple ones, which are composed of one type of monosaccharide, and complicated ones, which may be composed of two or more types of monosaccharides. Of the oligosaccharides, disaccharides are mainly present in the natural world in an isolated state. Specific examples of the disaccharides include sucrose contained in sugar canes, maltose (malt sugar) which is a digested material of starch by amylase and is a raw material of wheat gluten, lactose (milk sugar) contained in the milk of mammals, and the like. Reducing groups of these saccharides and hydroxy groups of saccharides or compounds except for the saccharides may undergo dehydration condensation.

Representative examples of a monomer that can be used as the polymerizable carbon-containing compound include furfuryl alcohol, divinylbenzene, phenol-formaldehyde, resorcinol-formaldehyde and the like.

The method of filling the carbon precursor in the pores of the template may be carried out as follows. First, a mixture containing the polymerizable carbon-containing compound and a liquid carrier may be impregnated into the pores of the template. Then, the polymerizable carbon-containing compound may be polymerized in the template to form a polymer of the polymerizable carbon-containing compound in the pores of the template. These processes may be repeated one or two times or more.

The carrier is in a liquid state and acts as a solvent dissolving the polymerizable carbon-containing compound and as a medium carrying the polymerizable carbon-containing compound to the pores of the template. The carrier may be selected from, for example, water, an organic solvent, and a mixture thereof. In particular, the organic solvent may be alcohol. More particularly, the alcohol may be ethanol. Furfuryl alcohol may be used as the polymerizable carbon-containing compound or as the carrier. Furfuryl alcohol used as the polymerizable carbon-containing compound may also be the carrier.

The mixture may further comprise an acid. The acid may promote the polymerization of the carbon precursor. The acid may be selected from, for example, sulphuric acid, hydrochloric acid, nitric acid, sulfonic acid, derivatives thereof, and a mixture of two or more of the foregoing materials. Representative examples of the sulfonic acid may include methylsulfonic acid and the like.

The concentrations of the respective constituents in the mixture are not particularly limited provided that the purpose of the present invention can be accomplished. For example, the concentrations of the respective constituents in the mixture may be as follows.

When the concentration of the carrier is too low, impregnation of the mixture into the template may not be easily performed. When the concentration of the carrier is too high, the amount of carbon filled in the template may be excessively decreased. Therefore, the concentration of the carrier may be, for example, in the range of about 300 parts to about 1000 parts by weight based on 100 parts by weight of the polymerizable carbon-containing compound.

When the concentration of the acid is too low, the effect of promoting the polymerization of the polymerizable carbon-containing compound according to the addition of an acid may be trivial. When the concentration of the acid is too high, the catalyzing effect may be saturated. In view of this, the concentration of the acid may be, for example, in the range of about 1 part to about 30 parts by weight based on 100 parts by weight of the polymerizable carbon-containing compound.

The polymerization of the polymerizable carbon-containing compound in pores of the template may be performed by, for example, heating, UV irradiation, and the like. When polymerising by heating, a heating temperature too low may result in insufficient polymerization and a heating temperature too high may decrease the uniformity of the resulting carbon molecular sieve. In view of this, the heating temperature of the template having the mixture impregnated therein may be, for example, in the range of about 50° C. to about 250° C. Alternatively, the heating may be performed in two steps of a first heating and a second heating. For example, the first heating may be performed at a temperature of about 50° C. to about 150° C. and the second heating may be performed at a temperature of about 150° C. to about 250° C. Through these heating processes, the carbon precursor can be polymerized and the liquid carrier can be vaporized.

Thus, the carbon precursor, i.e., the polymer of the polymerizable carbon-containing compound, filled in the template is converted to the carbon structure via thermal decomposition. In other words, the carbon precursor filled in pores of the template is carbonized by thermal decomposition. The thermal decomposition may be performed, for example, by heating the template having the carbon precursor impregnated therein at a temperature in the range of about 400° C. to about 1400° C. under a non-oxidizing atmosphere. The non-oxidizing atmosphere may be selected from among a vacuum, a nitrogen atmosphere, and inactive gas atmospheres. During this process, the carbon precursor is carbonized and the carrier and/or acid is removed via evaporation or decomposition.

After converting the carbon precursor filled in the template to the carbon structure, the template which is a silica molecular sieve may be removed by treating it with a solution capable of selectively dissolving silica. Examples of the solution capable of selectively dissolving only silica include an aqueous hydrofluoric acid solution, an aqueous sodium hydroxide solution, and the like. It is known that silica may be converted to a soluble silicate by alkaline fusion or carbonate melting and reacted with HF to form erodible $SiF_4$. The template may be treated with the silica-soluble solution several times depending on the type of silica molecular sieve used as the template so as to remove the template. Also, ethanol may be further added to the solution. Due to removal of the template, the carbon molecular sieve can be separated from the pores of the template.

The supported catalyst of the present invention may comprise the mesoporous carbon molecular sieve having mesopores with an average size of about 250 nm and a maximum particle size of about 500 nm, micropores with an average size in the range of about 3 nm to about 6 nm, a surface area in the range of about 500 $m^2/g$ to about 2000 $m^2/g$; and catalytic metal particles dispersed in and supported on the carbon molecular sieve.

In the supported catalyst of the present invention, the mesoporous carbon molecular sieve of the present invention as described above may be used as a support, and the catalytic metal particles may be dispersed in pores of the support.

As described above, when the mesoporous carbon molecular sieve may be used as the support of the supported catalyst, as the primary particle size of the mesoporous carbon molecular sieve decreases, electrochemical activity of the supported catalyst increases. By reducing the primary particle size of the mesoporous carbon molecular sieve having regularly arranged micropores and mesopores, the diffusion of reactants and the removal of products in the supported catalyst can occur smoothly, thus enabling all of the catalytic metal particles even in the micropores of the support to participate in the electrochemical reaction. However, when the primary particle size of the mesoporous carbon molecular sieve is too small, particles of the supported catalyst seriously agglomerate, thereby rather decreasing the coefficient of catalyst utilization. There is an appropriate range for the average primary particle size of the mesoporous carbon molecular sieve used as the carrier, and the appropriate range is less than about 500 nm, and more specifically in the range of about 250 nm to about 350 nm, and more specifically about 300 nm. The supported catalyst of the present invention has improved catalytic activity by using the support having an average primary particle size within the above range.

The catalytic metal that can be used for the supported catalyst of the present invention is not particularly limited and examples thereof include titanium (Ti), vanadium (V), chrome (Cr), manganese (Mn), iron (Fe), cobalt (Co), nickel (Ni), copper (Cu), zinc (Zn), aluminium (Al), molybdenum (Mo), selenium (Se), tin (Sn), platinum (Pt), ruthenium (Ru), palladium (Pd), tungsten (W), iridium (Ir), osmium (Os), rhodium (Rh), niobium (Nb), tantalum (Ta), lead (Pb), and a mixture of two or more of the foregoing metals.

The catalytic metal may be appropriately selected depending on a specific reaction to which the supported catalyst is to be applied. Also, the catalytic metal may be a single metal or an alloy of two or more metals.

Specifically, when the supported catalyst of the present invention is used for a catalyst layer of a cathode or an anode of a fuel cell such as PAFC, PEMFC, or the like, Pt may be generally used as the catalytic metal. Further, when the supported catalyst of the present invention is used for a catalyst layer of an anode of DMFC, a Pt—Ru alloy may be generally used as the catalytic metal. In this case, the atomic ratio of Pt—Ru may be typically about 0.5:1 to about 2:1. Further, when the supported catalyst of the present invention is used for a catalyst layer of a cathode of DMFC, Pt may be generally used as the catalytic metal.

When the average particle size of the catalytic metal particles is too small, the catalyst may not catalyse the catalytic reaction. When the average particle size of the catalytic metal particles is too large, a reaction surface area is decreased, resulting in reduced catalytic activity. In view of this, the average particle size of the catalytic metal particles may be in range of about 1 nm to about 5 nm.

When the concentration of catalytic metal particles in the supported catalyst is too low, the catalyst cannot be applied to a fuel cell, and when the concentration of catalytic metal particles in the supported catalyst is too high, the catalyst particle size can increase. In view of this, the concentration of catalytic metal particles in the supported catalyst may be in the range of about 50% to about 80% by weight based on the total weight of the supported catalyst.

To prepare the supported catalyst of the present invention, various known methods of preparing a supported catalyst can be used. For example, the supported catalyst of the present invention can be prepared by impregnating a solution of the catalytic metal precursor is in the carrier and then by reducing the catalytic metal precursor.

The fuel cell of the present invention may comprise a cathode, an anode, and an electrolyte membrane interposed between the cathode and the anode, and at least one of the cathode and the anode contains the supported catalyst of the present invention. Examples of the fuel cell of the present invention include PAFC, PEMFC, or DMFC. The construction of the fuel cells and the method of manufacturing such fuel cells, are not particularly limited, and specific examples thereof are known in various literatures in detail, and thus the detailed description thereon will not be provided here.

EXAMPLES

Specific Examples 1–2

Preparation of a Solution of Sodium Silicate

To control the average primary particle size of the mesoporous silica molecular sieve, sodium silicate solutions with different Na:Si atomic ratios were prepared. Na:Si atomic ratios of sodium silicate in the sodium silicate solutions prepared in Examples 1–2 were 1.5:1 and 2.5:1, respectively.

To prepare sodium silicate solutions of Examples 1–2, the corresponding amount of NaOH was first dissolved in distilled water, and then, Ludox HS-40 (Dupont, USA; the content of $SiO_2$: 40% by weight) was added thereto while stirring. The, contents of $Sio_2$ added to each of the solutions were identically 10% by weight. Then, the mixture was heated at a temperature of about 75° C. for about 30 minutes to obtain a clear solution. The conditions for preparing the sodium silicate solutions of Examples 1–2 are summarized in Table 1 below.

TABLE 1

| | Amount of water (g) used | Amount of NaOH (g) used | Amount of Ludox HS-40 (g) used | Na:Si atomic ratio of generated sodium silicate |
|---|---|---|---|---|
| Preparation Example 1 | 413.8 | 49.9 | 125 | 1.5 |
| Preparation Example 2 | 406.3 | 83.2 | 125 | 2.5 |

Specific Examples 3–4

Preparation of a Mesoporous Silica Molecular Sieve

To prepare the mesoporous silica molecular sieves of Examples 3–4, P123 polymer was dissolved in distilled water and sodium silicate solutions of Examples 1–2, respectively, were added to the resulting solution while stirring. An acetic acid was added to the mixture and heated at about 45° C. for about 24 hours to produce precipitates. The precipitates were filtered and washed with distilled water and then dried in a vacuum oven at room temperature for about 24 hours. The dried precipitates were calcined at about 550° C. for about 10 hours. The conditions for preparing the mesoporous silica molecular sieves of Examples 3–4, respectively, are summarized in Table 2 below.

TABLE 2

| | Amount of water (g) used | Amount of P123 (g) used | Sodium silicate solution | | | Amount of acetic acid (g) used | Average primary particle size of resulting silica molecular sieve (nm) |
| | | | Solution used | Amount (g) used | Na:Si atomic ratio of sodium silicate | | |
| --- | --- | --- | --- | --- | --- | --- | --- |
| Specific Example 3 | 59.9 | 1.643 | Preparation Example 1 | 10 | 1.5 | 1.498 | 700 |
| Specific Example 3 | 59.9 | 1.643 | Preparation Example 2 | 10 | 2.5 | 2.496 | 300 |

FIG. 1 is an XRD analysis result for the mesoporous silica molecular sieves of Examples 3–4. Referring to FIG. 1, it is apparent from a peak shown around 2θ and the weaker peaks shown thereafter, that the mesoporous silica molecular sieves of Examples 3–4 were well-ordered. The particle size of each of the mesoporous silica molecular sieves of Examples 3–4 was measured from its SEM photograph, and the result is shown in Table 2.

Specific Examples 5–6

Preparation of a Mesoporous Carbon Molecular Sieve

The mesoporous carbon molecular sieve of Example 5 was prepared using the mesoporous silica molecular sieve obtained in Example 3 as a template.

0.94 g of sucrose was dissolved in 3.75 g of secondary distilled water, and 0.11 g of 97% sulphuric acid was added to the aqueous solution to prepare a polymerizable carbon-containing compound impregnating solution. The impregnating solution was supported on the mesoporous silica molecular sieve obtained in Example 3 using an impregnating method. The impregnated silica molecular sieve was dried at about 100° C. for about 6 hours and heated at about 160° C. for 6 hours again. The silica molecular sieve that had undergone the first impregnation and drying, was impregnated again in the polymerizable carbon-containing compound impregnating solution, and then the resultant was dried and heated in the same manner as above. The amount of the impregnating solution used at the time of the second impregnation was about 60% of the amount of the impregnating solution used at the time of the first impregnation. The silica molecular sieve which had undergone the second impregnation and drying, was heated under a nitrogen atmosphere at about 200° C. for about 2 hours and then at about 900° C. for about 2 hours to carbonize the polymer from sucrose in the silica molecular sieve.

The silica molecular sieve having the carbonized sucrose polymer was added to a solution of $HF/H_2O/EtOH$ mixture (10% by weight of HF, 10% by weight of $H_2O$, and 80% by weight of EtOH). The mixture was stirred at room temperature for about 2 hours, and the silica molecular sieve was dissolved, allowing a carbon structure formed in the silica molecular sieve template to be isolated. The carbon materials (mesoporous carbon molecular sieve) was filtered and washed three times with second distilled water. These dissolving-filtering-washing processes were further performed two times to obtain a final carbon structure, which was dried at about 100° C. for about 12 hours.

Mesoporous carbon molecular sieve of Examples 2–6 was prepared in the same manner as in Example 5, except that the mesoporous silica molecular sieves of Example 4 were used as the template.

The physical properties of the mesoporous carbon molecular sieves of Example 5 and Example 6 are summarized in Table 3 below.

TABLE 3

| | Example 5 | Example 6 |
| --- | --- | --- |
| Size of template (nm) used | 300 | 700 |
| Physical properties of prepared mesoporous carbon molecular sieve | | |
| Average primary particle size (nm) | 298 | 552 |
| Average size of mesopore (nm) | 3.9 | 3.7 |
| Surface area ($m^2/g$) | 1158 | 1510 |

Figure 2:
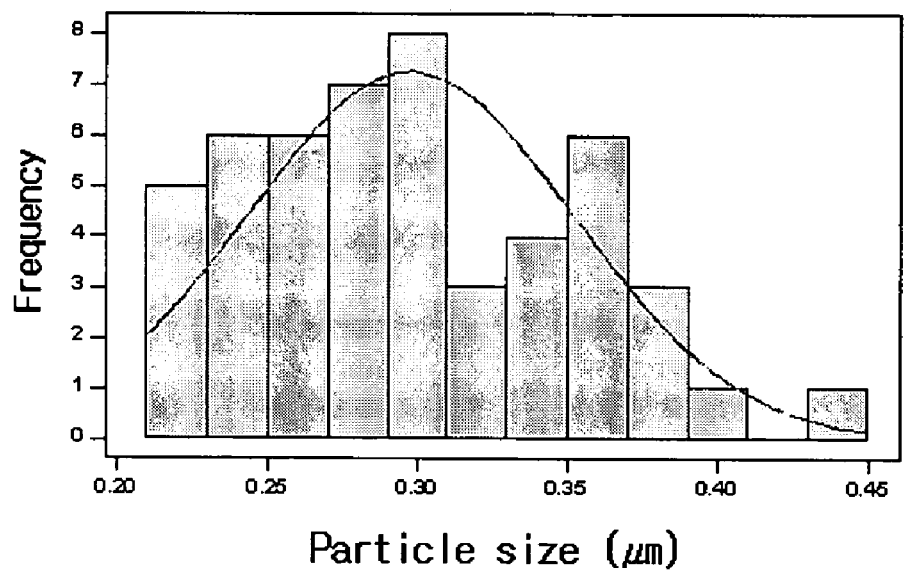
FIG. 2 is a particle size distribution chart of a mesoporous carbon molecular sieve according to an Example of the present invention.
Figure 3:
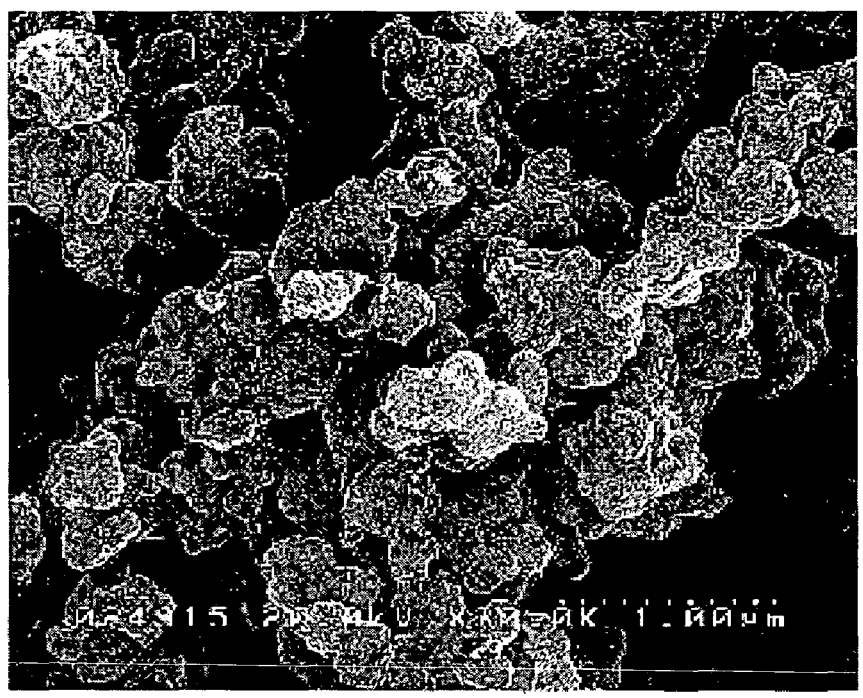
FIG. 3 is a SEM photograph of a mesoporous carbon molecular sieve according to an Example of the present invention.

FIG. 2 is a particle size distribution chart of the mesoporous carbon molecular sieve of Example 2. Referring to FIG. 2, the average primary particle size of the mesoporous carbon molecular sieve of Example 5 is 298 nm and the maximum particle size of the mesoporous carbon molecular sieve of Example 5 is about 500 nm. FIG. 3 is an SEM photograph of the mesoporous carbon molecular sieve of Example 5. Referring to FIG. 3, the mesoporous carbon molecular sieve powder according to Example 5 is composed of spherical particles having a very uniform size.

Specific Examples 7–8

Preparation of a Supported Catalyst

The supported catalyst of Example 7 is a carbon supported platinum catalyst using the mesoporous carbon molecular sieve obtained in Example 5 as a support. The supported catalyst was prepared as follows.

0.5 g of the mesoporous carbon molecular sieve was mixed with a solution of 0.9616 g of $H_2PtCl_6$ in 1.5 ml of acetone and the mixture was dried in the air for about 4 hours. The mesoporous carbon molecular sieve having an impregnated platinum precursor was placed in a crucible and dried at about 60° C. for more than about 12 hours. After placing the crucible in an electric furnace, nitrogen gas was supplied to the furnace for about 10 minutes, and then the atmosphere of the electric furnace was switched to hydrogen gas, thereby reducing the platinum precursor. This heating process was performed once again, and the carbon supported platinum catalyst with platinum loading amount of about 60% by weight was prepared.

The carbon supported platinum catalysts of Example 8 was prepared in the same manner as in Example 7, except that the mesoporous carbon molecular sieve of Example 6 was used as carriers.

Specific Examples 9–10

Manufacturing of a Fuel Cell

The fuel cell of Example 9 included a cathode containing the supported catalyst of Example 7, an anode containing an PtRu black catalyst, and a Nafion 117 electrolyte membrane. The loading of platinum in the cathode was 3 mg/cm$^2$, and the loading of PtRu in the anode was 8 mg/cm$^2$.

The fuel cell of Example 10 was manufactured in the same manner as in Example 9, except that the carbon supported platinum catalyst of Example 8 was used in the cathode.

The fuel cell of Example 11 was manufactured in the same manner as in Example 10, except that the conventional carbon black supported platinum catalyst was used in the cathode.

Evaluation of Performance of the Fuel Cell

The performance of each of the fuel cells of Example 9 and Examples 10 and 11 was measured under the following conditions. A 2M aqueous methanol solution was used as a fuel, and air was used as an oxidizing agent. The working temperature of the fuel cells was 40° C. The evaluation results of the performance are summarized in Table 4 below.

TABLE 4

|  | Example 9 | Example 10 | Example 11 (Pt/black) |
|---|---|---|---|
| Current density (mA/cm$^2$) @ 0.4 V, 40° C. | 42 | 81 | 60 |
| Particle size of Pt catalyst (nm) | 2.8 | 3.1 | 8.0 |

As is apparent from Table 4, the fuel cell of Example 10 has much higher current density generated at 0.4 V of potential than the fuel cells of Examples 10 and 11. In other words, the mesoporous carbon molecular sieve of the present invention can greatly improve the electrochemical activity of the fuel cell.

However, comparing the fuel cells of Examples 10 and 11, it can be seen that the performance of a fuel cell is not necessarily improved by using the mesoporous carbon molecular sieve. Since the catalyst particle size of Example 8 is much less than that of Pt Black catalyst, the fuel cell of Example 10 using the catalyst of Example 8 must have higher performance than the fuel cell of Example 11 using the Pt Black catalyst. However, the performance of the fuel cell of Example 11 is indeed higher than the fuel cell of Example 10. This is because the average primary particle size of the support of 550 nm is too large to utilize all catalyst particles dispersed in the support. Moreover, the catalyst of Example 8 prepared using the mesoporous carbon molecular sieve of Example 5 with the particle size distribution illustrated in FIG. 2 as a support has the primary particle size of the support sufficient to utilize catalyst particles. Thus, the fuel cell of Example 10 using the catalyst of Example 8 has the improved performance.

When the mesoporous carbon molecular sieve of the present invention having an average primary particle size of 500 nm and less is used as a carrier of a supported catalyst, the diffusion of reactants and the removal of products in the supported catalyst occurs the support can participate in the electrochemical reaction. Accordingly, the supported catalyst of the present invention can display improved catalytic activity by using the above support. Also, the fuel cell using the supported catalyst of the present invention can display improved electrochemical activity.

What is claimed is:

1. A mesoporous carbon molecular sieve for a support of a supported catalyst, wherein the mesoporous carbon molecular sieve has an average primary particle size of less than about 500 nm, an average mesopore size in the range of about 3 nm to about 6 nm, and a surface area in the range of about 500 m2/g to about 2000 m2/g.

2. A method of preparing a mesoporous carbon molecular sieve, comprising:

filling a carbon precursor in pores of a template composed of a mesoporous silica having an average primary particle size in the range of about 250 nm to about 700 nm;

thermally decomposing the carbon precursor by heating the template having the carbon precursor impregnated under a non-oxidizing atmosphere, to form a carbon structure in the pores of the template; and removing the template using a silica-soluble solution, thereby isolating the carbon structure.

* * * * *